(12) United States Patent
Xiao et al.

(10) Patent No.: US 12,462,448 B2
(45) Date of Patent: Nov. 4, 2025

(54) IMAGE PROCESSING METHOD AND ELECTRONIC DEVICE

(71) Applicant: Honor Device Co., Ltd., Guangdong (CN)

(72) Inventors: Bin Xiao, Shenzhen (CN); Yu Wang, Shenzhen (CN); Tao Shao, Shenzhen (CN); Congchao Zhu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 44 days.

(21) Appl. No.: 18/279,093

(22) PCT Filed: Apr. 29, 2022

(86) PCT No.: PCT/CN2022/090655
§ 371 (c)(1),
(2) Date: Aug. 28, 2023

(87) PCT Pub. No.: WO2023/020017
PCT Pub. Date: Feb. 23, 2023

(65) Prior Publication Data
US 2024/0153157 A1    May 9, 2024

(30) Foreign Application Priority Data

Aug. 20, 2021    (CN) .......................... 202110964854.1

(51) Int. Cl.
*G06T 11/00*    (2006.01)
*G06F 3/048*    (2013.01)
(Continued)

(52) U.S. Cl.
CPC .............. *G06T 11/001* (2013.01); *G06T 7/11* (2017.01); *G06T 7/90* (2017.01); *G06V 10/56* (2022.01);
(Continued)

(58) Field of Classification Search
CPC ..... G06T 7/90; G06T 7/11; G06T 5/92; G06T 5/60; G06T 11/001; G06T 2207/20081;
(Continued)

(56) References Cited

U.S. PATENT DOCUMENTS 6,480,299 B1    11/2002    Drakopoulos et al.
8,849,056 B2    9/2014    Wakazono
(Continued)

FOREIGN PATENT DOCUMENTS

CN    102385746 A    3/2012
CN    103733219 A    4/2014
(Continued)

*Primary Examiner* — Wesner Sajous

(57) ABSTRACT

An image processing method and an electronic device are disclosed, and relate to the field of image processing technologies. The image processing method includes: displaying a first interface, and determining, on the first interface, a first file selected by a user; displaying a second interface, and displaying a generated lookup table on the second interface; determining, on the second interface, a target lookup table selected by the user from the lookup table, and performing color adjustment on the first file by using the target lookup table; and displaying a color-adjusted first file. In the image processing method, an image can be processed according to a user requirement, and difficulty of image processing is reduced.

12 Claims, 9 Drawing Sheets

(51) Int. Cl.
*G06T 7/11* (2017.01)
*G06T 7/90* (2017.01)
*G06V 10/56* (2022.01)
*G06V 10/75* (2022.01)
*G09G 5/02* (2006.01)
*G09G 5/06* (2006.01)
*H04N 1/60* (2006.01)
*H04N 5/57* (2006.01)

(52) U.S. Cl.
CPC ............... *G06T 2207/10024* (2013.01); *G06T 2207/20081* (2013.01); *G06T 2207/20084* (2013.01)

(58) Field of Classification Search
CPC ........... G06T 2207/10024; G06T 2207/20084; G06V 10/56; G06V 10/77; G06V 10/75; G06V 10/88; G06V 10/82; G06V 10/774; G06V 10/776; G06V 10/98; G06V 10/267; G06V 10/22; G06V 10/945; G06V 20/40–41; G09G 5/02; G09G 5/06; G09G 5/10; G09G 2320/06; G09G 2320/066; G09G 2320/0271; G09G 2320/0276; G06F 3/048; G06F 3/0482–0488; H04N 1/58; H04N 1/60; H04N 1/6019–6027; H04N 5/202; H04N 5/57–58; H04N 9/64–78; G06N 3/042; G06N 3/045; G06N 3/08; G06N 3/09; G06N 3/0464

See application file for complete search history.

(56) References Cited

U.S. PATENT DOCUMENTS

| | | | |
|---|---|---|---|
| 9,532,019 | B2 | 12/2016 | Wang et al. |
| 9,639,936 | B2 | 5/2017 | Kondo |
| 10,839,589 | B2 * | 11/2020 | Cilingir ................... G06T 9/001 |
| 11,567,770 | B2 | 1/2023 | Pineda De Gyvez et al. |
| 2003/0185457 | A1 | 10/2003 | Campbell |
| 2012/0057785 | A1 * | 3/2012 | Morovic .............. H04N 1/6047 382/167 |
| 2016/0133174 | A1 | 5/2016 | Ji-Yeon et al. |
| 2017/0185891 | A1 | 6/2017 | Hosokawa et al. |
| 2018/0314726 | A1 | 11/2018 | Bath et al. |
| 2020/0159871 | A1 * | 5/2020 | Bowen ................... G06T 11/60 |
| 2021/0248716 | A1 | 8/2021 | Vera-Gonzalez et al. |
| 2022/0392038 | A1 * | 12/2022 | Sun .......................... G06T 5/20 |

FOREIGN PATENT DOCUMENTS

| | | |
|---|---|---|
| CN | 106791756 A | 5/2017 |
| CN | 104813272 B | 3/2019 |
| CN | 108307088 B | 7/2019 |
| CN | 112435156 A | 3/2021 |
| CN | 113256504 A | 8/2021 |
| EP | 3388981 A1 | 10/2018 |
| KR | 20190074938 A | 6/2019 |
| WO | 2021052342 A1 | 3/2021 |

* cited by examiner

IMAGE PROCESSING METHOD AND ELECTRONIC DEVICE

CROSS-REFERENCE TO RELATED APPLICATIONS

This application is a National Stage of International Application No. PCT/CN2022/090655, filed on Apr. 29, 2022, which claims priority to Chinese Patent Application No. 202110964854.1, filed on Aug. 20, 2021, both of which are hereby incorporated by reference in their entireties.

TECHNICAL FIELD

This application relates to the field of image processing technologies, and in particular, to an image processing method and an electronic device.

BACKGROUND

An Look Up Table (LUT) is a lookup table, also referred to as a color lookup table or a color mapping table, and may be used for adjusting a color value of an image. The LUT may be stored as an LUT file with a file format of .lut. An electronic device may convert an original color value (namely, RGB values) of each pixel in the image into a corresponding target color value based on the LUT, to change original color effect of the image.

When an image processing professional needs to adjust colors of a plurality of images or videos, for example, needs to increase brightness of a group of photos in dark colors, the image processing professional needs to first manually produce an LUT, store the produced LUT, and then adjust, by using the stored LUT, the colors of the plurality of images or videos whose colors need to be adjusted, so that the plurality of images or videos are presented in a uniform style. Currently, an LUT can be produced only through processing by a professional technician on a professional tool. For example, a tool for producing an LUT is PhotoShop software. A technician needs to first select a picture (for example, a picture A) and import the picture into the PhotoShop software, then adjust a color level of the picture A in the PhotoShop software to obtain an adjusted picture A1, and then adjust a color of the picture A1 by using a curve tool to obtain an adjusted picture A2. If color effect of the picture A2 is still unsatisfactory, the technician may further fine-tune an unsatisfactory part of the picture A2 to obtain a final picture A3. In the foregoing process, the PhotoShop software may calculate an LUT based on parameters (for example, a color level value and RGB values) adjusted each time. A user may export the calculated LUT to a specified location for storage by using an LUT export function provided by the PhotoShop software.

It can be learned that a process of producing an LUT in the PhotoShop software is complex. In addition, costs and difficulty of learning, by a user, to use professional tools such as the PhotoShop software and learning related image processing principles are high. As a result, it is difficult for a common user to produce an LUT.

SUMMARY

This application provides an image processing method and an electronic device, to greatly reduce difficulty of generating an LUT and improve efficiency of generating an LUT.

According to a first aspect, this application provides an image processing method. In the method, first, a first interface is displayed, and a first file selected by a user is determined on the first interface; then a second interface is displayed, and a generated lookup table is displayed on the second interface; a target lookup table selected by the user from the lookup table is determined on the second interface, and color adjustment is performed on the first file by using the target lookup table; and a color-adjusted first file is displayed.

In this solution, the user may select, according to a requirement of the user, the target lookup table from a plurality of lookup tables displayed on an interface for color adjustment. This can meet an image processing requirement of the user, and improve user experience. In addition, during image processing, the user does not need to produce a lookup table. This greatly reduces difficulty of image processing for the user.

In a possible implementation of the first aspect of this application, the method further includes a step of generating a lookup table. The step is as follows: first, determining a first image selected by the user and a second image corresponding to the first image, where the second image is an image obtained through first color adjustment on the first image; and generating, based on the first image and the second image, a lookup table (LUT) corresponding to the first color adjustment, where the lookup table corresponding to the first color adjustment is used for enabling the first file and the second image to have same color adjustment effect during the color adjustment on the first file.

In this implementation, a corresponding lookup table (LUT) may be automatically generated based on the first image and the second image for use by the user. Compared with a process of producing an LUT in the related art, this is simpler, and can reduce difficulty of producing an LUT, and improve efficiency of producing an LUT. In addition, an LUT can be quickly generated for any color adjustment style that the user likes, so that the color adjustment style can be added to a file that needs to be processed, to meet an image color adjustment requirement of the user.

In a possible implementation of the first aspect of this application, the lookup table may include a global lookup table and a local lookup table.

Specifically, during generation of a global lookup table based on the first image and the second image, the first image and the second image may be input to a preset deep neural network model, to obtain a global lookup table output by the deep neural network model. In this implementation, a process of generating the global lookup table is simple, and when the global lookup table is used for image processing, a processing speed and efficiency are high.

During generation of a local lookup table based on the first image and the second image, the first image and the second image are segmented into N subblocks in a same segmentation manner; a subblock in the first image is used as a first subblock, a subblock in the second image is used as a second subblock, and then the first subblock in the first image and the second subblock in the second image are combined into an input data pair to obtain N input data pairs, where a location of a first subblock of each input data pair in the first image is the same as a location of a second subblock in the second image; the N input data pairs obtained through combination are input in the deep neural network model to obtain N subblock lookup tables output by the deep neural network model; and the N subblock lookup tables are combined to obtain the local lookup table. In this implementation, when the local lookup table is used for image processing, different color adjustment can be performed on different parts of an image by using the local lookup table, so that there is a contrast between different parts, to present richer details and improve color adjustment effect.

In a possible implementation of the first aspect of this application, the N subblock lookup tables may be smoothed before the N subblock lookup tables are combined; and then smoothed N subblock lookup tables are combined to obtain the local lookup table. During color adjustment by using the smoothed local lookup table, different parts can be better blended to achieve uniform color adjustment effect, so that visual experience is smoother, and poor color adjustment effect caused by a large color change difference of an image can be avoided.

Specifically, the smoothing the N subblock lookup tables includes: determining a weight corresponding to each subblock lookup table; calculating a first product of an output value of an $N^{th}$ subblock lookup table and a weight corresponding to the $N^{th}$ subblock lookup table, and a second product of an output value of an adjacent lookup table and a weight corresponding to the adjacent lookup table, where the adjacent lookup table is a subblock lookup table adjacent to the $N^{th}$ subblock lookup table; and then replacing the output value of the $N^{th}$ subblock lookup table with a sum of the first product and the second product. In this implementation, each subblock lookup table is smoothed by using a weighted summation algorithm, and a final local lookup table may be determined based on an influence of an output value of each subblock lookup table, so that the local lookup table has uniform color adjustment effect.

In a possible implementation of the first aspect of this application, generation of the deep neural network model includes: obtaining a first sample and a plurality of second samples obtained through different color adjustment on the first sample; combining one first sample and one second sample into a sample pair; and inputting the obtained sample pair to a deep neural network model to train the deep neural network model, so that a trained deep neural network model can output a lookup table corresponding to the sample pair. In this implementation, the deep neural network model can output corresponding lookup tables for different input, so that efficiency of determining a lookup table can be improved.

In a possible implementation of the first aspect of this application, during generation of a lookup table based on the first image and the second image, a color value of the first image may be used as an input value, and a color value of the second image may be used as an output value; a target polynomial between the input value and the output value is determined by using a polynomial fitting algorithm; and a lookup table corresponding to color adjustment effect of the first image and the second image is calculated by using the target polynomial. In this implementation, no model needs to be trained in advance in the polynomial fitting manner, thereby saving time. In addition, only a current group of first image and second image needs to be fitted by using the target polynomial, so that calculation is fast.

In a possible implementation of the first aspect of this application, during color adjustment on the first file, a third interface may be displayed to the user, and a lookup table type selected by the user is determined on the third interface, where the lookup table type includes a global lookup table and a local lookup table; and then a corresponding lookup table is obtained based on the lookup table type selected by the user, and the obtained lookup table is displayed on the second interface. In this implementation, the user can select the global lookup table for color adjustment on the file (namely, the first file), or select the local lookup table for color adjustment on the file. This can provide more color adjustment manners and color adjustment effect for the user, to meet a user requirement and improve user experience.

In a possible implementation of the first aspect of this application, the first file includes at least one of an image or a video. The user may perform color adjustment on a plurality of images by using the generated lookup table, and a plurality of processed images have uniform color adjustment effect. The user may also perform color adjustment on a plurality of videos by using the lookup table, and processed videos also have color adjustment effect expected by the user. This reduces difficulty of color adjustment, and improves efficiency of color adjustment.

According to a second aspect, this application provides an electronic device. The electronic device includes a memory, a display, and one or more processors. The display is configured to display an image generated by the processor. The memory stores one or more computer programs. The computer program includes instructions. When the instructions are executed by the processor, the electronic device is enabled to perform the method according to any one of the first aspect or the possible implementations of the first aspect.

According to a third aspect, this application provides an electronic device. The electronic device includes a memory, a display, and one or more processors. The display is configured to display an image generated by the processor. The memory stores one or more computer programs. The computer program includes instructions. When the instructions are executed by the processor, the electronic device is enabled to perform the following steps: displaying a first interface, and determining, on the first interface, a first file selected by a user; displaying a second interface, and displaying a generated lookup table on the second interface; determining, on the second interface, a target lookup table selected by the user from the lookup table, and performing color adjustment on the first file by using the target lookup table; and displaying a color-adjusted first file.

In a possible implementation of the third aspect of this application, when the instructions are executed by the processor, the electronic device is enabled to perform the following steps: determining a first image selected by the user and a second image corresponding to the first image, where the second image is an image obtained through first color adjustment on the first image; and generating, based on the first image and the second image, a lookup table (LUT) corresponding to the first color adjustment, where the lookup table corresponding to the first color adjustment is used for enabling the first file and the second image to have same color adjustment effect during the color adjustment on the first file.

In a possible implementation of the third aspect of this application, the lookup table includes a global lookup table and a local lookup table.

In a possible implementation of the third aspect of this application, when the instructions are executed by the processor, the electronic device is enabled to perform the following step: inputting the first image and the second image to a preset deep neural network model, to obtain a global lookup table output by the deep neural network model.

In a possible implementation of the third aspect of this application, when the instructions are executed by the processor, the electronic device is enabled to perform the following steps: segmenting the first image and the second image into N subblocks in a same segmentation manner; combining a first subblock in the first image and a second subblock in the second image into an input data pair to obtain N input data pairs, where a location of the first subblock of the input data pair in the first image is the same as a location of the second subblock in the second image; inputting the N input data pairs to the deep neural network model to obtain N subblock lookup tables; and combining the N subblock lookup tables to obtain the local lookup table, where N is a positive integer.

In a possible implementation of the third aspect of this application, when the instructions are executed by the processor, the electronic device is enabled to perform the following steps: smoothing each subblock lookup table; and combining smoothed N subblock lookup tables to obtain local lookup table.

In a possible implementation of the third aspect of this application, when the instructions are executed by the processor, the electronic device is enabled to perform the following steps: determining a weight corresponding to each subblock lookup table; calculating a first product of an output value of an $N^{th}$ subblock lookup table and a weight corresponding to the $N^{th}$ subblock lookup table, and a second product of an output value of an adjacent lookup table and a weight corresponding to the adjacent lookup table, where the adjacent lookup table is a subblock lookup table adjacent to the $N^{th}$ subblock lookup table; and replacing the output value of the $N^{th}$ subblock lookup table with a sum of the first product and the second product.

In a possible implementation of the third aspect of this application, when the instructions are executed by the processor, the electronic device is enabled to perform the following steps: obtaining a first sample and a plurality of second samples obtained through different color adjustment on the first sample; combining the first sample and the second sample of the first sample into a sample pair, where each sample pair includes a first sample and a second sample of the first sample; and inputting the sample pair to the deep neural network model to train the deep neural network model, so that a trained deep neural network model can output a global lookup table corresponding to each sample pair.

In a possible implementation of the third aspect of this application, when the instructions are executed by the processor, the electronic device is enabled to perform the following steps: using a color value of the first image as an input value, and using a color value of the second image as an output value; determining a target polynomial between the input value and the output value by using a polynomial fitting algorithm; and outputting, by using the target polynomial, the lookup table corresponding to first color adjustment effect.

In a possible implementation of the third aspect of this application, when the instructions are executed by the processor, the electronic device is enabled to perform the following steps: displaying a third interface, and determining, on the third interface, a lookup table type selected by the user, where the lookup table type includes a global lookup table and a local lookup table; and obtaining a lookup table corresponding to the lookup table type, to display the lookup table corresponding to the lookup table type on the second interface.

In a possible implementation of the third aspect of this application, the first file includes at least one of an image or a video.

According to a fourth aspect, this application provides a computer-readable storage medium. The computer-readable storage medium stores instructions. When the instructions run on an electronic device, the electronic device is enabled to perform the method according to any one of the first aspect or the possible implementations of the first aspect.

According to a fifth aspect, this application provides a computer program product. When the computer program product runs on an electronic device, the electronic device is enabled to perform the method according to any one of the first aspect or the possible implementations of the first aspect.

It can be understood that, for beneficial effect that can be achieved by the electronic device according to any one of the second aspect, the third aspect, or the possible implementations of the second aspect or the third aspect, the computer-readable storage medium according to the fourth aspect, and the computer program product according to the fifth aspect, reference may be made to the beneficial effect in any one of the first aspect or the possible designs of the first aspect. Details are not described herein again.

DESCRIPTION OF EMBODIMENTS

Figure 1:
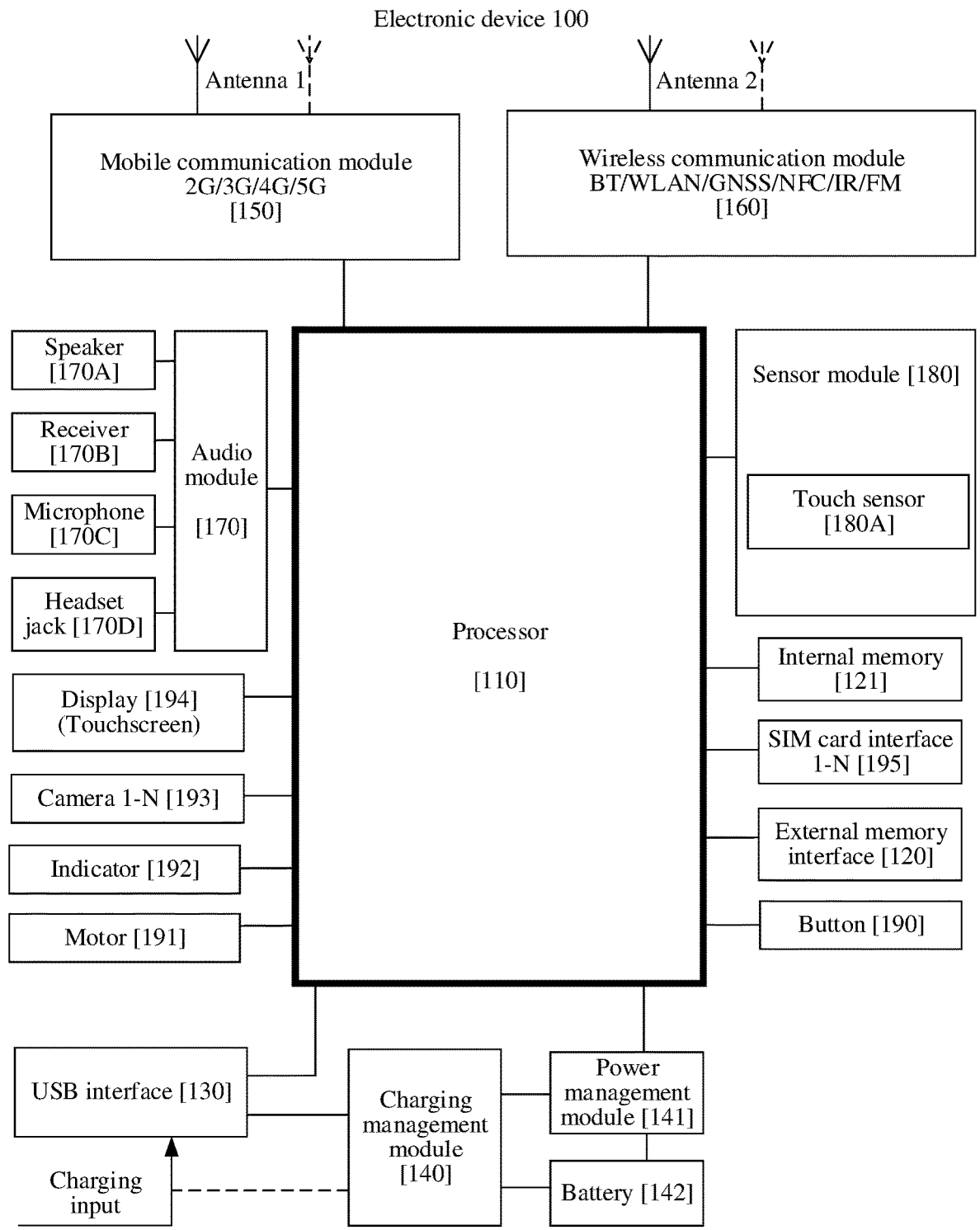
FIG. 1 is a schematic diagram of a hardware structure of an electronic device according to an embodiment of this application.

The terms "first" and "second" mentioned below are used merely for the purpose of description, and shall not be construed as indicating or implying relative importance or implying a quantity of indicated technical features. Therefore, a feature limited by "first" or "second" may explicitly or implicitly include one or more of the features. In descriptions of the embodiments, unless otherwise stated, "a plurality of" means two or more.

Currently, electronic devices such as mobile phones have been widely used in people's daily life. An image displayed or stored on an electronic device may also be referred to as a digital image, and is collectively referred to as an image subsequently. The image is an important means for the electronic device to obtain information and transmit information, and is also a visual basis of user perception.

Usually, the image includes pixels, and each pixel includes three subpixels: a red (Red) subpixel, a green (Green) subpixel, and a blue (Blue) subpixel. A value range of each subpixel is 0 to 255. RGB values of the pixel may also be referred to as color values or a color of the pixel. For example, RGB (0, 0, 0) indicate that values of the red, green, and blue subpixels are all 0, and in this case, the color of the pixel is white; RGB (255, 0, 0) indicates that a value of the red subpixel is 255 and values of the other subpixels are 0, and in this case, the color of the pixel is true red; and RGB (255, 255, 255) indicates that values of the red, green, and blue subpixels are all 255, and in this case, the color of the pixel is black.

An LUT is a mapping table for color values, and is used for representing a correspondence between an input value and an output value of a color value. For example, refer to Table 1.

TABLE 1

| Input value | | | Output value | | |
| --- | --- | --- | --- | --- | --- |
| R | G | B | R | G | B |
| 14 | 22 | 24 | 6 | 9 | 4 |
| 61 | 34 | 67 | 66 | 17 | 47 |
| 94 | 14 | 171 | 117 | 82 | 187 |
| ... | ... | ... | ... | ... | ... |
| 241 | 216 | 222 | 255 | 247 | 243 |

When input values of a color value are (14, 22, 24), output values of the color value are (6, 9, 4) based on the mapping in the LUT shown in Table 1. When input values of a color value are (61, 34, 67), output values are (66, 17, 47) based on the mapping in the LUT shown in Table 1. When input values of a color value are (94, 14, 171), output values of the color value are (117, 82, 187) based on the mapping in the LUT shown in Table 1. When input values of a color value are (241, 216, 222), output values of the color value are (255, 247, 243) based on the mapping in the LUT shown in Table 1.

LUTs are mainly classified into a 1D LUT and a 3D LUT, namely, a one-dimensional lookup table and a three-dimensional lookup table. Each R, G, or B input value in the 1D LUT has a specific output value ranging from 0 to 255, and values of the three subpixels are independent of each other. To be specific, if a value of a red subpixel R in a pixel changes, output values of the other two subpixels (G and B) are not affected, and only an output value of the red subpixel R changes. It can be learned that a change of a color in each pixel in the 1D LUT does not affect changes of other colors. However, in the 3D LUT, a change of a value of a subpixel (for example, R) cause changes of values of the other two subpixels (G and B). Therefore, compared with the 1D LUT, the 3D LUT has more abundant color variations, and can meet fine-grained color control requirements.

In the conventional technology, an LUT needs to be produced by a professional technician by using a professional tool, for example, PhotoShop, Image, or other software. A production process is complex, and it is difficult for a common user to produce an LUT. In addition, usually, these dedicated tools can hardly be installed or run on portable terminals such as mobile phones, and therefore cannot be used to produce or export an LUT on a mobile phone, and cannot meet an image processing requirement of a user.

Based on this, the embodiments of this application provide an image processing method and an electronic device, to resolve a problem that an LUT production process is complex and time-consuming. In the embodiments of this application, an electronic device may automatically generate an LUT with same color adjustment effect as a second image based on a first image selected by a user and the second image obtained through specific color adjustment (namely, first color adjustment) on the first image, and apply the LUT to a first file (for example, a video or an image) that the user needs to process, to complete color adjustment on the first file. It can be learned that, in the technical solution provided in the embodiments, a complex LUT production process can be omitted, and an LUT can be quickly generated based on color adjustment effect expected by the user, to reduce difficulty of producing an LUT and improve efficiency of generating an LUT.

In addition, the user may select the first image and color adjustment effect (namely, the second image) of the first image based on a preference of the user. Different LUTs may be obtained for different color adjustment effect of the same first image, so that a variety of color adjustment effect can be obtained for the same first file, to meet a color adjustment requirement of the user, and improve operation experience of the user during color adjustment.

The following describes implementations of the embodiments in detail with reference to the accompanying drawings.

The embodiments of this application first provide an image processing method. For example, the image processing method may be applied to an electronic device with a display function, such as a mobile phone, a tablet computer, a personal computer (PC), a wearable electronic device (for example, a smartwatch), an augmented reality (AR)/virtual reality (VR) device, or an in-vehicle device (also referred to as an in-vehicle infotainment system). This is not limited in the embodiments of this application.

For example, the electronic device is a mobile phone. FIG. 1 is a schematic diagram of a structure of an electronic device 100 according to an embodiment of this application. The electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like.

The sensor module 180 may include a pressure sensor, a gyro sensor, a barometric pressure sensor, a magnetic sensor, an acceleration sensor, a distance sensor, an optical proximity sensor, a fingerprint sensor, a temperature sensor, a touch sensor 180A, an ambient light sensor, a bone conduction sensor, and the like.

It can be understood that the structure shown in this embodiment of the present invention does not constitute a specific limitation on the electronic device 100. In some other embodiments of this application, the electronic device 100 may include more or fewer components than those shown in the figure, or some components may be combined, or some components may be split, or there may be a different component layout. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or a micro controller unit (MCU). Different processing units may be separate devices, or may be integrated into one or more processors.

The controller may be a nerve center and a command center of the electronic device 100. The controller may generate an operation control signal based on an instruction operation code and a time sequence signal, to control instruction fetching and instruction execution.

The processor 110 may be further provided with a memory to store instructions and data. In some embodiments, the memory in the processor 110 is a cache memory. The memory may store instructions or data recently used or cyclically used by the processor 110. If the processor 110 needs to use the instructions or the data again, the processor 110 may directly call the instructions or the data from the memory. This avoids repeated access, and reduces waiting time of the processor 110, thereby improving system efficiency.

In some embodiments, the processor 110 may include one or more interfaces. The interface may include an inter-integrated circuit (I2C) interface, a serial peripheral interface (SPI), an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identification module (SIM) interface, a universal serial bus (USB) interface, and/or the like.

It may be understood that an interface connection relationship between the modules illustrated in this embodiment of the present invention is merely an example for description, and does not constitute a limitation on a structure of the electronic device 100. In some other embodiments of this application, the electronic device 100 may alternatively use an interface connection manner different from that in the foregoing embodiment, or use a combination of a plurality of the interface connection manners.

The charging management module 140 is configured to receive charging input from a charger. The power management module 141 is connected to the battery 142, the charging management module 140, and the processor 110. The power management module 141 receives input from the battery 142 and/or the charging management module 140, and supplies power to the processor 110, the internal memory 121, an external memory, the display 194, the camera 193, the wireless communication module 160, and the like. In some other embodiments, the power management module 141 and the charging management module 140 may alternatively be disposed in a same device.

A wireless communication function of the electronic device 100 may be implemented by the antenna 1, the antenna 2, the mobile communication module 150, the wireless communication module 160, the modem processor, the baseband processor, and the like. The antenna 1 and the antenna 2 are configured to transmit and receive an electromagnetic wave signal. Each antenna of the electronic device 100 may be configured to cover one or more communication frequency bands. Different antennas may be further multiplexed to improve utilization of the antennas. For example, the antenna 1 may be multiplexed into a diversity antenna of a wireless local area network. In some other embodiments, the antennas may be used with a tuning switch.

The mobile communication module 150 may provide a solution applied to the electronic device 100 for wireless communication such as 2G/3G/4G/5G. The wireless communication module 160 may provide a solution applied to the electronic device 100 for wireless communication such as a wireless local area network (WLAN) (for example, a Wi-Fi network), Bluetooth (BT), a global navigation satellite system (GNSS), frequency modulation (FM), NFC, and an infrared (IR) technology.

The electronic device 100 implements a display function by using the GPU, the display 194, the application processor, and the like. The GPU is a microprocessor for image processing, and is connected to the display 194 and the application processor. The GPU is configured to perform mathematical and geometric computation, and render an image. The processor 110 may include one or more GPUs that execute program instructions to generate or change display information.

The display 194 is configured to display an image, a video, and the like. The display is a touchscreen. In some embodiments, the electronic device 100 may include 1 or N displays 194, where N is a positive integer greater than 1.

The electronic device 100 may implement a photographing function by using the ISP, the camera 193, the video codec, the GPU, the display 194, the application processor, and the like. The ISP is configured to process data fed back by the camera 193. The camera 193 is configured to capture a static image or a video. In some embodiments, the electronic device 100 may include 1 or N cameras 193, where N is a positive integer greater than 1.

The NPU is a neural-network (NN) computing processor. The NPU quickly processes input information with reference to a structure of a biological neural network, for example, with reference to a transfer mode between human brain neurons, and may further continuously perform self-learning. The NPU may implement applications such as intelligent cognition of the electronic device 100, for example, screen protector state recognition, image inpainting, image recognition, facial recognition, speech recognition, and text comprehension.

The external memory interface 120 may be used for connecting an external storage card such as a micro SD card, to expand a storage capability of the electronic device 100. The external storage card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to implement various functional applications and data processing of the electronic device 100. The internal memory 121 may include a program storage area and a data storage area. The program storage area may store an operating system, an application required by at least one function (for example, a sound play function or an image play function), and the like. The data storage area may store data (such as audio data and an address book) and the like that are created during use of the electronic device 100. In addition, the internal memory 121 may include a high-speed random access memory, or may include a non-volatile memory such as at least one magnetic disk memory, a flash memory, or a universal flash storage (UFS).

The electronic device 100 may implement audio functions, for example, music playing and recording, by using the audio module 170, the speaker 170A, the receiver 170B, the microphone 170C, the earphone jack 170D, the application processor, and the like.

The touch sensor 180A is also referred to as a "touch panel (TP)". The touch sensor 180A may be disposed in the display 194, and the touch sensor 180A and the display 194 form a touchscreen, which is also referred to as a "touch control screen". The touch sensor 180A is configured to detect a touch operation performed on or near the touch sensor. The touch sensor may transmit the detected touch operation to the application processor to determine a type of a touch event. Visual output related to the touch operation may be provided by using the display 194. In some other embodiments, the touch sensor 180A may alternatively be disposed on a surface of the electronic device 100, at a location different from that of the display 194.

The button 190 includes a power button, a volume button, and the like. The motor 191 may generate a vibration prompt. The indication device 192 may be an indicator, and may be configured to indicate a charging status and a battery level change, or may be configured to indicate a message, a missed call, a notification, or the like. The SIM card interface 195 is used for connecting a SIM card.

Generally, after an image capture device such as a mobile phone or a camera captures an image, a user adjusts a color of the captured image, for example, adjusts color brightness or saturation. The color of the image is adjusted, to achieve better color effect of the image, and present a style or atmosphere expected by the user. A same picture may be processed into different hues to express different emotional atmosphere, such as warm or cold. In professional fields (such as the film or television field), a user usually watches color-adjusted captured pictures. Real captured pictures may differ in colors due to environmental changes (for example, intensity of light). In this case, uniform light and shade effect can be achieved through color adjustment.

In an example application scenario, when a user A wants to learn color adjustment performed by another service person (for example, a user B) on a picture A, an LUT corresponding to color adjustment effect of the picture A may be determined by using the image processing method in the embodiments. In this way, a service person 1 can reproduce color adjustment effect similar to that of the picture A by using the LUT.

In another example application scenario, when a user A wants to process a video to achieve color adjustment effect consistent with that of a specific picture (for example, a picture A), an electronic device may generate, by using the image processing method provided in the embodiments, an LUT corresponding to the color adjustment effect of the picture A, and then the user may perform color adjustment on the to-be-processed video by using the generated LUT, so that the video generally has color adjustment effect similar to that of the picture A.

Figure 2:
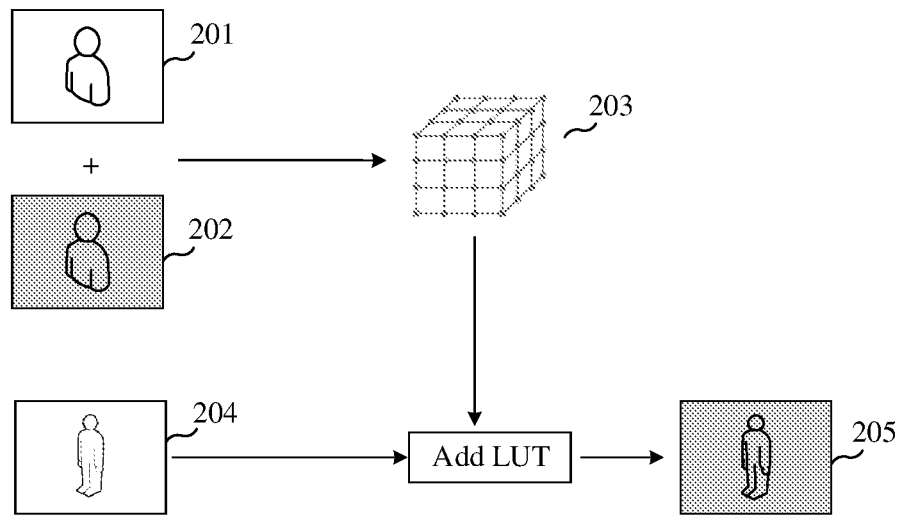
FIG. 2 is a schematic diagram of an application scenario of an image processing method according to an embodiment of this application.

For example, an application such as an album or a gallery of the mobile phone may read an image stored in a memory of the mobile phone, and display the image. As shown in FIG. 2, a user may select an image 201 and an image 202 from a plurality of images displayed on a mobile phone. The image 202 is an image obtained through specific color adjustment (namely, first color adjustment) on the image 201. After detecting the selection operation performed by the user, the mobile phone may determine the image 201 selected by the user as a first image, and determine the image 202 as a second image obtained through color adjustment. Then the mobile phone may establish a mapping relationship between a color in the first image 201 and a color in the second image 202, and calculate, based on the mapping relationship, an LUT 203 corresponding to color adjustment effect of the second image 202.

Subsequently, when the user wants to perform color adjustment on a first file (for example, an image 204) on the mobile phone, the user may operate the mobile phone to perform color adjustment on the image 204 by using the LUT 203, and add, to the image 204, color adjustment effect corresponding to the LUT 203, to obtain a color-adjusted image 205. The image 205 has color adjustment effect that is the same as or similar to that of the second image 202. For example, if the second image 202 has a "romantic" hue, the image 205 may also present a "romantic" hue.

In the foregoing implementation, the user does not need to manually produce the LUT 203, but selects the second image 202 with color adjustment effect of an LUT and the corresponding first image 201, to trigger the mobile phone to automatically calculate the LUT 203 used by the second image 202. In this way, the mobile phone can apply the automatically generated LUT 203 to a file (for example, the image 204) that the user needs to process, so that the file has the same color adjustment effect. It can be learned that, in the foregoing solution, a function of generating an LUT can be provided on an electronic device such as a mobile phone to facilitate promotion and use of an LUT technology, and difficulty of producing an LUT can also be reduced, to improve efficiency.

The following describes in detail an image processing method provided in an example embodiment.

For example, the image processing method in this embodiment may include the following steps.

Step 1: A mobile phone obtains a first image selected by a user and a second image corresponding to the first image, where the second image is an image obtained through color adjustment on the first image.

For example, the first image and the second image can be pre-imported by the user into the mobile phone. For example, the user may download, by using the mobile phone, a first image and a second image obtained by adding a specific color adjustment style to the first image. The user may alternatively download a plurality of second images with different color adjustment styles for a same first image, and store the second images on the mobile phone. Alternatively, the first image may be captured by a camera of the mobile phone. After the first image is captured by the camera of the mobile phone, the user may perform color adjustment on the first image by using image processing software on the mobile phone, to obtain a processed second image. Alternatively, the mobile phone may be connected to another electronic device (for example, another mobile phone), to obtain a first image and a second image that are transmitted by the another mobile phone.

It should be noted that the second image is an image obtained through color adjustment based on the first image. The first image may be processed into different styles of color adjustment effect through different color adjustment. That is, one first image may correspond to a plurality of second images. In addition, the second image is an image obtained through color adjustment on the first image. Therefore, image content and image resolutions of the second image and the first image are the same. In addition, other attributes of the first image and the second image may be different. For example, attributes such as image sizes and file formats may be different.

For example, when the user sees, on the mobile phone, that color adjustment effect of an image 202 obtained through color adjustment on an image (for example, an image 201) is quite good and wants to process other images on the mobile phone into similar color adjustment effect, or when the user wants to obtain an LUT corresponding to the color adjustment effect of the image 202 and store the LUT for future use, the user may first store the image 201 and the image 202 on the mobile phone, and then, when producing an LUT corresponding to the image 202, the mobile phone may use the image 201 as the first image and the image 202 as the second image based on selection by the user.

Figure 3:
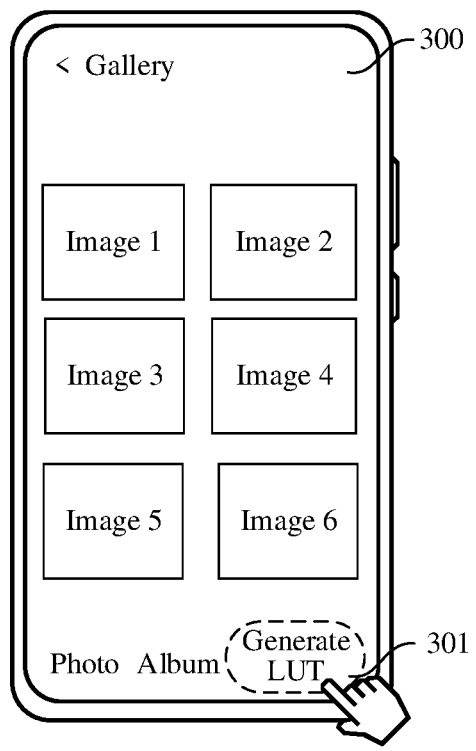
FIG. 3 is a schematic diagram of an image processing interface of a mobile phone according to an embodiment of this application.

For example, when the user needs to generate an LUT for an image, the user may start the image processing software such as a gallery or an album on the mobile phone. The image processing software may search for all images stored in a memory of the mobile phone, and display the images. For example, as shown in FIG. 3, when the image processing software (for example, the gallery) is started, the image processing software may display a display interface 300, where the display interface 300 may include a control 301 for creating an LUT. For example, a name of the control 301 is "Generate LUT". When the mobile phone detects that the control 301 is tapped by the user, the mobile phone may obtain a first image and a second image for current LUT production.

In some embodiments, the mobile phone may obtain the first image and the second image selected by the user respectively on different display interfaces.

Figure 4:
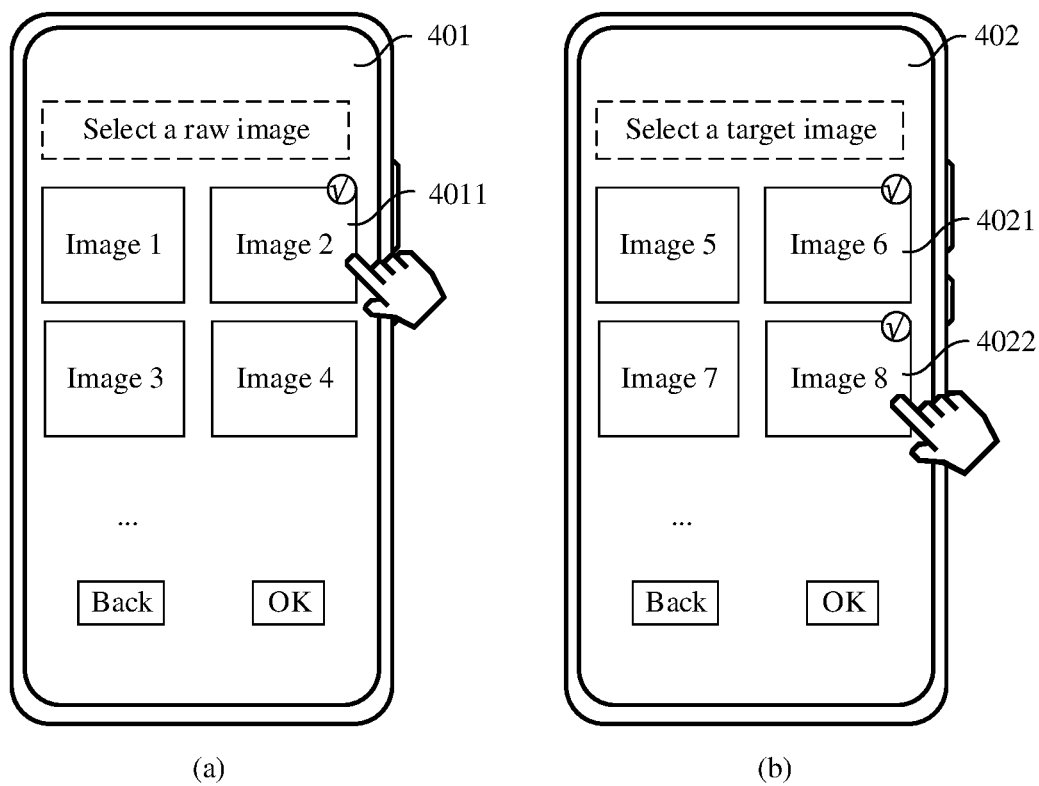
FIG. 4 is a schematic diagram of an interface for determining a raw image and a target image in an image processing method according to an embodiment of this application.

For example, in response to the operation of tapping the control 301 by the user on the display interface 300, as shown in (a) in FIG. 4, the mobile phone may first display a display interface 401, where the display interface 401 may be an entrance for selecting, by the user, a first image for current LUT production. For example, the display interface 401 includes one or more images stored on the mobile phone, and the user may select any image on the display interface 401. The mobile phone may mark the image (for example, an image 4011) selected by the user based on a tap operation performed by the user on the display interface 401. Subsequently, if the mobile phone detects that the user taps an "OK" control on the display interface 401, the mobile phone may determine the image 4011 selected by the user as a first image. Optionally, the mobile phone may further obtain information such as an image name and an image identification number of the image 4011. Similarly, after the mobile phone determines the image 4011 as the first image, as shown in (b) in FIG. 4, the mobile phone may display a display interface 402, where the display interface 402 may be an entrance for selecting by the user, a second image for the current LUT production. Similar to the display interface 401, the display interface 402 may include one or more images stored on the mobile phone. A difference lies in that the user may select one or more images on the display interface 402 as a second image for the current LUT production. For example, if the mobile phone detects that the user selects an image 4021 and an image 4022 on the display interface 402 and taps an "OK" control, the mobile phone may determine the image 4021 and the image 4022 selected by the user as second images.

In some other embodiments, the mobile phone may alternatively obtain the first image and the second image on a same display interface according to an order of selecting images by the user.

For example, the mobile phone may use an image selected by the user earlier as the first image, and use an image selected by the user later as the second image. The display interface 402 shown in (b) in FIG. 4 is used as an example. The user may select a plurality of images on the display interface 402. The mobile phone may receive an operation of selecting images by the user on the display interface, and record an image selection order. When detecting that the user taps the "OK" control on the display interface 402, the mobile phone may use the $1^{st}$ image selected by the user as the first image, and use the $2^{nd}$ image selected by the user as the second image. If the user performs more than two operations, that is, the user selects more than two images on the display interface 402, the mobile phone may use the $1^{st}$ image selected by the user as the first image, and use the remaining plurality of images selected by the user as second images.

In some embodiments, the mobile phone may display a prompt message on the display interface 402, where the prompt message may be used for prompt the user to select the first image and the second image in order. For example, a prompt message "Select a first image first" is used for prompting the user, so that the user selects the first image and the second image as prompted by the mobile phone. In addition, in the foregoing implementation, the mobile phone may alternatively use an image selected by the user later as the first image, and use an image selected by the user earlier as the second image. For example, the user sequentially selects three images on the display interface 402 shown in (b) in FIG. 4, and the mobile phone may record an order of selecting the images by the user, use the last image selected by the user as the first image, and use the other images as second images.

After the mobile phone determines the first image and the second image selected by the user this time, the mobile phone may add different identifiers to the first image and the second image for identification. For example, an identifier of the first image is "1", and an identifier of the second image is "2". For another example, an identifier of the first image is "0", and an identifier of the second image is "1". In addition, the identifier may alternatively be a letter, a symbol, or a combination of a digit, a letter, and a symbol. This is not particularly limited in this implementation.

Step 2: The mobile phone generates, based on the first image and the second image, a lookup table (LUT) corresponding to first color adjustment effect.

After obtaining the first image and the second image selected by the user, the mobile phone may read pixels of the first image and pixels of the second image. The mobile phone may establish a one-to-one correspondence between the read pixels of the first image and the read pixels of the second image, and may calculate, based on two pixels that correspond to each other, a relationship between changes of color values of pixels in the first image and the second image, to determine a lookup table (LUT) corresponding to color adjustment effect of the second image.

For example, the lookup table (LUT) may include a global lookup table (Global LUT) and a local lookup table (Local LUT). The local lookup table is an LUT specific to each part of an image. Compared with the global lookup table, the local lookup table can be used for performing color adjustment on different parts of the image to control color adjustment effect of the image, so that the parts of the image have more fine-grained contrast effect after color adjustment is performed on the image. A 3D LUT is used as an example. A global three-dimensional lookup table (Global 3D LUT) can control overall color effect of an image, and a local three-dimensional lookup table (Local 3D LUT) can control not only color effect of the image, but also a contrast between various parts of the image.

In some implementations, the mobile phone may determine, through polynomial fitting, a global lookup table corresponding to the color adjustment effect of the second image.

For example, the mobile phone may use a color value of each pixel in the first image as an input value, and use a color value of a pixel at a same location in the second image as an output value. Then the mobile phone may calculate a target polynomial between the first image and the second image by using the input value and the output value.

FIG. 2 is still used as an example. The first image 201 and the second image 202 each include m×n pixels, where m×n is a resolution of the first image and the second image. The mobile phone may sequentially read a color value X1 of a pixel (0, 0), a color value X2 of a pixel (0, 1), a color value X3 of a pixel (0, 2), . . . , and a color value Xmn of a pixel (m, n) of the first image 201, and use X1, X2, X3, . . . , and Xmn as input values. The mobile phone may further sequentially read a color value Y1 of a pixel (0, 0), a color value Y2 of a pixel (0, 1), a color value Y3 of a pixel (0, 2), . . . , and a color value Ymn of a pixel (m, n) of the second image 202, use Y1 as an output value of X1, use Y2 as an output value of X2, use Y3 as an output value of X3, . . . , and use Ymn as an output value of Xmn.

In this way, an input value and an output value of color values of pixels at same locations can constitute a sample point, that is, (X1, Y1), (X2, Y2), (X3, Y3), . . . , and (Xmn, Ymn). In this case, the first image and the second image can constitute m×n sample points.

Then the mobile phone may substitute the m×n sample points into a polynomial formula through polynomial fitting, to calculate coefficients of a polynomial, and obtain the target polynomial. The polynomial formula is as follows: $y=a_0+a_1 x+a_2 x^2+a_3 x^3+ \ldots +a_n x^n$. The mobile phone may substitute the m×n sample points (X1, Y1), (X2, Y2), (X3, Y3), . . . , and (Xmn, Ymn) into the foregoing polynomial. The mobile phone may calculate coefficients $a_0$, $a_1$, $a_2$, . . . , and $a_n$ of terms based on the m×n sample points, to obtain values of the coefficients of the terms, and determine the target polynomial.

After determining the target polynomial, the mobile phone may calculate, by using the target polynomial, an output value corresponding to each color value, to obtain the LUT corresponding to the color adjustment effect of the second image. For example, when the color value is 0, x in the target polynomial is 0, and a corresponding value of y is an output value corresponding to the color value. Similarly, an output value corresponding to an input value of each color value may be calculated by using the target polynomial, and the output value corresponding to the input value of each color value is stored in an LUT file format, to obtain the LUT corresponding to the second image.

For example, during polynomial fitting, the coefficients $a_0$, $a_1$, $a_2$, . . . , and $a_n$ of the target polynomial may be determined by using the least square method. The least square method is a method for calculating an error during fitting, and an optimal value of polynomial coefficients is obtained by minimizing a quadratic sum of errors. Specifically, the mobile phone may first initialize the coefficients of the foregoing polynomial into a value, for example, 1. In this case, a polynomial whose coefficients are all 1 is used as a target polynomial 1. For the m×n sample points, an input value (for example, X1) is used as x to calculate a y value corresponding to the target polynomial 1. A square S of a difference between the y value and a real output value (for example, Y1) of the sample point is calculated. Then S corresponding to all sample points is added to obtain an error s1. Coefficients of terms of the target polynomial 1 are transformed to obtain a target polynomial 2. Similarly, an error s2 corresponding to the target polynomial 2 is calculated, an error s3 corresponding to a target polynomial 3 is calculated, and so on. The polynomial coefficients can be changed r times, errors respectively corresponding to r target polynomials are calculated, and a target polynomial with a smallest error is used as a final target polynomial. r may be set by a person skilled in the art based on experience, and is not limited in this implementation.

In addition, r may alternatively not be set, and whether a target polynomial needs to be further optimized is determined based on an error. For example, when the error s1 corresponding to the target polynomial 1 is greater than a threshold q, the polynomial coefficients are changed to obtain the target polynomial 2, iteration is performed repeatedly until an error corresponding to a target polynomial is not greater than the threshold q, and the target polynomial is determined as a final target polynomial. The error threshold may be determined based on an actual case. For example, the threshold may be 0.1 or 0.2. This is not limited in this implementation.

Certainly, a person skilled in the art may alternatively determine the coefficients of the target polynomial by using another algorithm or model. This is not limited in this embodiment of this application.

In some other implementations, the mobile phone may determine, by using a deep neural network model, a global lookup table corresponding to the color adjustment effect of the second image. The deep neural network model may extract changes of corresponding pixels in the first image and the second image, to learn the change relationship, and determine, by using the learned change relationship, a lookup table corresponding to color adjustment effect.

For example, the mobile phone may input the first image and the second image selected by the user to the deep neural network model preset on the mobile phone, to obtain a global three-dimensional lookup table output by the deep neural network model. The deep neural network model may determine a mapping relationship between an input value and an output value based on color changes of corresponding pixels in the first image and the second image, and then predict, based on the mapping relationship, an output value corresponding to an input value of each color value, to obtain the global three-dimensional lookup table.

Figure 5:
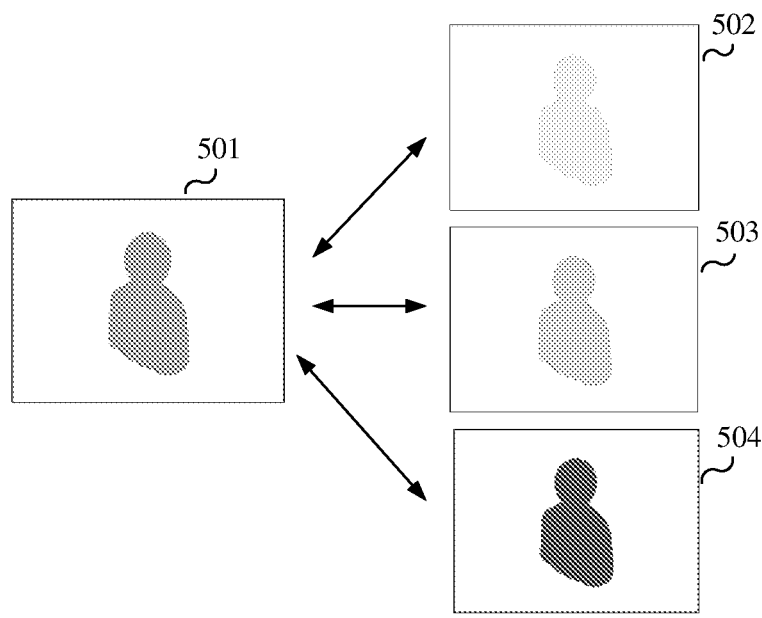
FIG. 5 is a schematic diagram of an image in an image processing method according to an embodiment of this application.

In this implementation, the deep neural network model is not used only for one type of color adjustment effect, but can obtain the global three-dimensional lookup table corresponding to a plurality of types of color adjustment effect. For example, as shown in FIG. 5, an image 501 corresponds to three images with different color adjustment effect: an image 502, an image 503, and an image 504. When the first image selected by the user is the image 501, the deep neural network model can output a corresponding lookup table regardless of whether the second image selected by the user is the image 502, the image 503, or the image 504. For example, when the first image selected by the user is the image 501 and the second image is the image 502, the deep neural network model may output a corresponding lookup table 1; or when the first image selected by the user is the image 501 and the second image is the image 503, the deep neural network model may output a corresponding lookup table 2. It can be learned that the deep neural network model can cope with various input after training, and therefore has high efficiency.

During determining of a lookup table by using the deep neural network model, the deep neural network model needs to be first obtained through training on a preset device, and then the preset device may send the deep neural network model obtained through training, for example, a deep neural network model 601, to the mobile phone, so that the mobile phone obtains, by using the deep neural network model, the global lookup table corresponding to the second image selected by the user.

Figure 6:
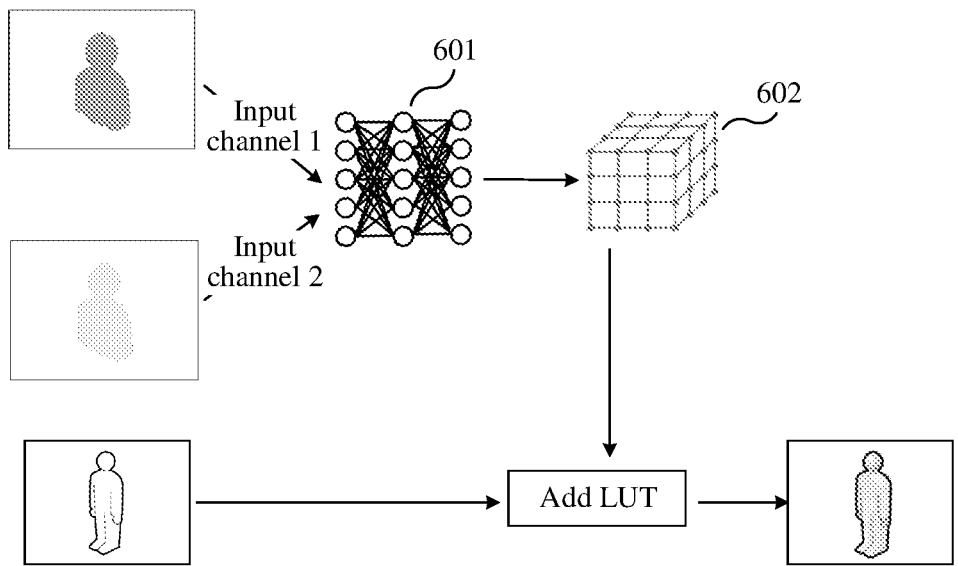
FIG. 6 is a schematic diagram of an application scenario of an image processing method according to an embodiment of this application.

The preset device needs to obtain a first sample and a plurality of second samples of the first sample. Similar to that in step 1, a second sample is also an image obtained through color adjustment on the first sample. As shown in FIG. 6, the first sample is an image 501, and the second samples are images 502, 503 and 504. Then the preset device may use the first sample and a second sample of the first sample as a sample pair. When the first sample corresponds to a plurality of second samples, the first sample and the second samples may be combined to obtain a plurality of sample pairs. Finally, the preset device inputs the obtained sample pairs to the deep neural network model 601 to train the deep neural network model 601. A learning objective of the deep neural network model 601 is to determine a mapping relationship, so that the first sample can be mapped to a corresponding second sample based on the mapping relationship, and then a global lookup table is output based on the mapping relationship Specifically, a specific quantity of first samples and a plurality of second samples with different color adjustment effect for each first sample may be manually collected in advance. In terms of a plurality of second samples of a first sample, a professional may perform color adjustment on each first sample to obtain second samples with different color adjustment effect. A professional or an image creator usually uploads, to a network, contrast images with various color adjustment effect that are manually processed by the professional or the image creator, for mutual communication and learning. Therefore, an image that has not undergone color adjustment may be downloaded through the network and stored as a first sample, and a color-adjusted image may be downloaded and stored as a second sample, to obtain a specific quantity of samples, for example, 1000 groups of sample pairs. Certainly, a quantity of samples may alternatively be another value, for example, 500 sample pairs. This is determined according to an actual requirement and is not limited in this implementation.

The first sample is combined with a second sample with one type of color adjustment effect into a sample pair. If a first sample has a plurality of types of color adjustment effect, a second sample with each type of color adjustment effect may be combined with the first sample into a sample pair, to obtain a sample pair corresponding to each type of color adjustment effect. As shown in FIG. 5, a first sample 501 corresponds to second samples 502, 503, and 504 with three different types of color adjustment effect, and obtained sample pairs are (501, 502), (501, 503), and (501, 504).

The deep neural network model provided in this implementation may include two input channels, and each sample pair is input to a corresponding input channel of the deep neural network model as a group of input of the deep neural network model. As shown in FIG. 6, the first sample 501 is input through an input channel 1, and the second sample 502 is input through an input channel 2. The deep neural network model 601 may establish a correspondence between a color value of each pixel in the first sample 501 and a color value of each pixel in the second sample 502, and then calculate a mapping relationship between color values of two pixels that correspond to each other. The preset device may first determine an initial mapping relationship for the deep neural network model 601, and then sequentially read pixels from the first sample and the second sample. In this case, a color value of the $1^{st}$ pixel in the first sample corresponds to a color value of the $1^{st}$ pixel in the second sample. For example, reading starts from the $1^{st}$ pixel (0, 0) in upper left corners of the first sample 501 and the second sample 502. At the first time, a color value rgb1 of the pixel (0, 0) of the first sample 501 and a color value rgb2 of the pixel (0, 0) of the second sample 502 are read. rgb1 and rgb2 are used as a group of values for calculating loss of the initial mapping relationship, and the initial mapping relationship is optimized based on the calculated loss.

Because mapping relationships for different color adjustment effect need to be learned, the deep neural network model 601 may include a plurality of convolutional layers, and different relational expressions Y may be used for the convolutional layers. In addition, different weight coefficients W may be further set for the convolutional layers. During calculation of loss, each relational expression is combined with a corresponding weight coefficient W for calculating loss of one round of training. For example, at a convolutional layer 1, a mapping relationship between two input color values may be learned by using the following relational expression: $y=ax^2+bx+c$, where a, b, and c are parameters of the model. An input value, for example, a color value of the $1^{st}$ pixel in the first sample 501, is used as a value of x, and is substituted into the relational expression $y=ax^2+bx+c$, to calculate a y value. An error between the y value and another input value, namely, a color value of the $1^{st}$ pixel in the second sample 502, is calculated. Similarly, a sum of errors of all pixels in the first sample 501 is calculated, and then loss of the convolutional layer 1 may be obtained based on a weight coefficient W of the convolutional layer 1. Loss of the deep neural network model can meet a requirement after a plurality of times of iterative optimization, and parameters in this case are used as final parameters such as a, b, c, and W, to determine a final mapping relationship. An output value corresponding to each color value may be calculated by using the mapping relationship, to obtain 3D LUTs for different color adjustment effect, for example, a 3D LUT 602 corresponding to the first sample 501 and the second sample 502.

The electronic device may package a trained deep neural network model, and set a packaged deep neural network on the mobile phone, for example, add the packaged deep neural network to an application framework layer of the mobile phone. An application on the mobile phone may call the deep neural network by using a preset call interface, and obtain a result, namely, an LUT, returned by the deep neural network. When an application (for example, an application 1) on the mobile phone needs to generate an LUT, the call interface may be called, and a first image and a second image selected by the user are input to the deep neural network model through the call interface. The deep neural network model may determine a mapping relationship between the first image and the second image selected by the user, and obtain an LUT between the first image and the second image by using the mapping relationship. Then the deep neural network model may return the generated LUT to the application 1 or another application through the call interface. During training of the deep neural network model, samples do not need to be manually labeled. This belongs to unsupervised machine learning. This is simpler and reduces labor costs compared with an algorithm that requires manual labeling.

It should be noted that, in addition to generating a global lookup table according to the foregoing method, the mobile phone may further generate a local lookup table based on the first image and the second image.

In a scenario in which a local lookup table is generated by using the first image and the second image, the mobile phone first segments the first image into a plurality of subblocks and segments the second image into a same quantity of subblocks, and then inputs, to the trained deep neural network model, an input data pair including a first subblock in the first image and a second subblock in the second image, to obtain a subblock lookup table output by the deep neural network model for the input data pair. The subblock lookup table is a global lookup table corresponding to the input data pair. It should be understand that each input data pair includes a first subblock and a second subblock, and a location of the first subblock in the first image is the same as a location of the second subblock in the second image. Finally, the mobile phone may combine all subblock lookup tables, and a local lookup table corresponding to the second image can be obtained after the combination. That is, the local lookup table includes a plurality of subblock lookup tables.

For example, the first image may be segmented into 9 subblocks in a 3×3 format, or 16 subblocks in a 4×4 format, or may be segmented in another segmentation manner. This is not particularly limited in this implementation. A segmentation manner for the second image needs to be the same as that for the first image. For example, the first image is segmented at pixel coordinates (10, y), where y is an integer with a value ranging from 0 to a height of the first image, that is, the first image is vertically segmented at the $10^{th}$ pixel in a horizontal direction of the first image. In this case, the second image also needs to be segmented at (10, y). That is, after segmentation, a quantity and a size of subblocks obtained by segmenting the second image are the same as those of subblocks of the first image.

Figure 7:
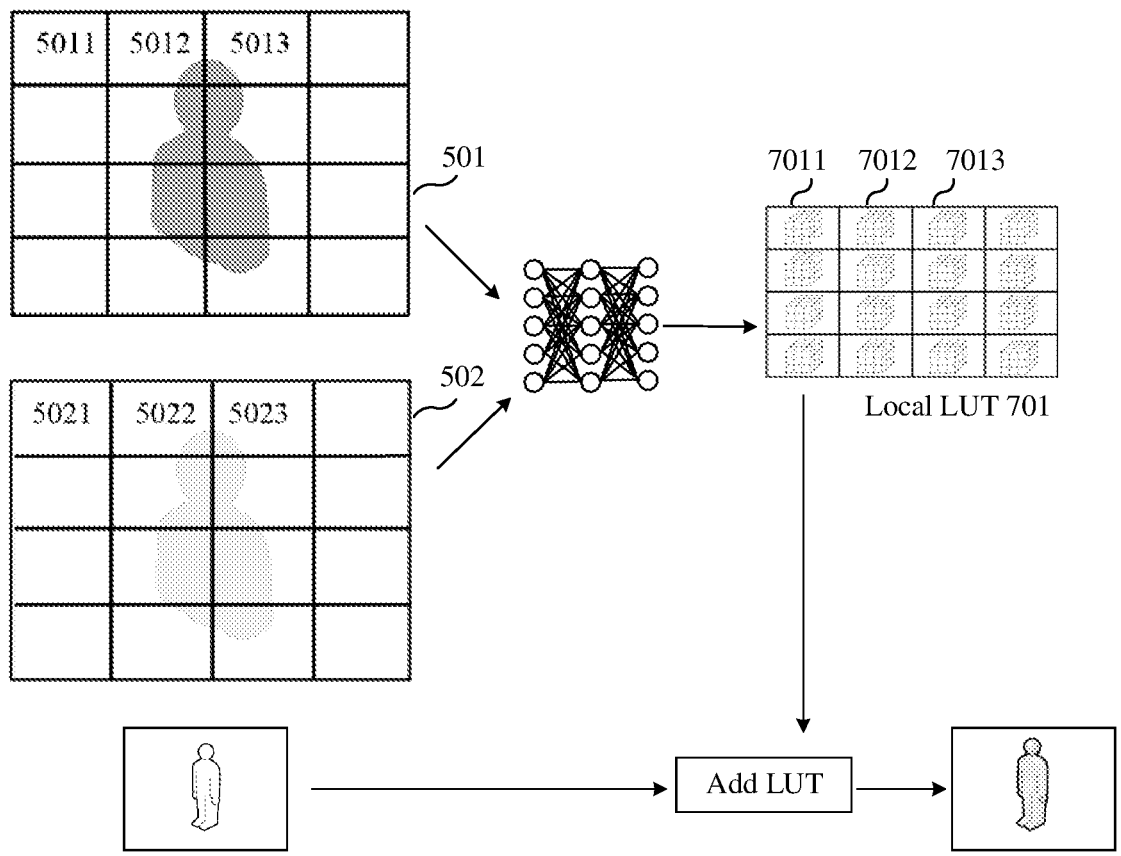
FIG. 7 is a schematic diagram of another application scenario of an image processing method according to an embodiment of this application.

As shown in FIG. 7, the first image 501 may be evenly segmented into 4×4 subblocks, and the second image 502 is also divided into 4×4 subblocks in a same segmentation manner. Subblocks obtained by segmenting the first image may be first subblocks, and subblocks obtained by segmenting the second image may be second subblocks. For example, 4×4 first subblocks may be obtained by segmenting the first image 501, and 4×4 second subblocks may be obtained by segmenting the second image 502.

The mobile phone may combine the first subblocks and the second subblocks into input data pairs as input for the deep neural network model. Each input data pair may include a first subblock and a second subblock, and pixel locations of the first subblock and the second subblock are the same. For example, a first subblock 5011 in the first image 501 and a second subblock 5021 in the second image 502 constitute an input data pair, a first subblock 5012 and a second subblock 5022 constitute an input data pair, and a first subblock 5013 and a second subblock 5023 constitute an input data pair. The mobile phone inputs each input data pair to the deep neural network model to obtain a corresponding output result as a subblock lookup table (subblock LUT) for the input data pair. In this way, the mobile phone inputs each input data pair of the first image 501 and the second image 502 to the deep neural network model to obtain a subblock LUT corresponding to each input data pair. For example, when an input data pair is (5011, 5021), a corresponding subblock LUT is an LUT 7011; when an input data pair is (5012, 5022), a corresponding subblock LUT is an LUT 7012; and when an input data pair is (5013, 5023), a corresponding subblock LUT is an LUT 7013.

The mobile phone may obtain, according to the foregoing method, a subblock LUT corresponding to each data pair in the first image 501 and the second image 502. Then the mobile phone may combine all subblock LUTs of the first image 501 and the second image 502, and a local lookup table corresponding to the second image 502 can be obtained after the combination.

In an example implementation, after the mobile phone inputs the first image and the second image to the deep neural network model to obtain all subblock LUTs output by the deep neural network model, the mobile phone may smooth each subblock LUT, and use a smoothed subblock LUT as a local lookup table.

For example, a smoothing process specifically includes the following steps: First, a weight of each subblock LUT is determined. Then, for each subblock LUT, a value of the subblock is multiplied by a weight of the subblock, and then a product is added to a product obtained by multiplying a value of an adjacent subblock by a weight of the adjacent subblock, to obtain a final local lookup table for the subblock.

The weight of each subblock LUT may be preset. This is not limited in this implementation. For example, it is assumed that a weight of the subblock LUT 7011 is a, adjacent subblock LUTs of the subblock LUT are 7012, 7014, and 7015, and weights of the adjacent subblock LUTs are b, c, and d respectively. For the subblock LUT 7011, Aa+Bb+Cc+Dd=an LUT obtained by smoothing the subblock LUT 7011, where A, B, C, and D are values of the subblock LUTs respectively. For example, a value (1, 2, 3) in the subblock LUT 7011 is smoothed into (a+Bb+Cc+Dd, 2a+Bb+Cc+Dd, 3a+Bb+Cc+Dd). A smoothed local LUT can not only control a contrast between parts of an image, but also provide smoother visual experience. This can reduce poor color adjustment effect caused by a large color change difference of an image.

After the mobile phone generates an LUT, the generated LUT may be exported. The user may choose to export a global LUT or a local LUT. In addition, the user can manage an exported LUT, for example, name the LUT and specify an LUT storage path.

Figure 8:
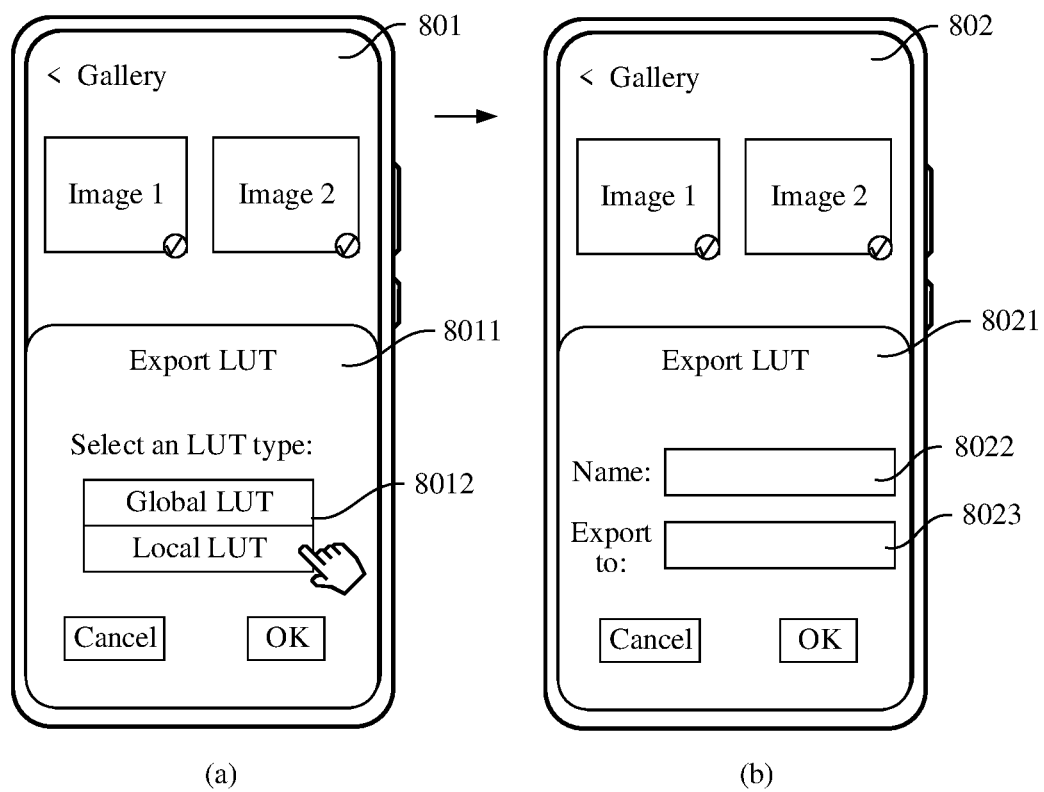
FIG. 8 is a schematic diagram of an interface for generating an LUT on a mobile phone according to an embodiment of this application.

For example, as shown in (a) in FIG. 8, on a display interface 801, after the user selects a first image and a second image, a prompt box 8011 may be displayed, where the prompt box 8011 is used for prompting the user to select a type of a to-be-exported LUT. A control 8012 may be displayed in the prompt box 8011. The mobile phone may receive, through the control 8012, an LUT type selected by the user. When the user taps the control 8012, the mobile phone may determine, based on a location tapped by the user, an LUT type that the user needs to select (for example, the user may select a local LUT). The mobile phone may generate, based on the operation performed by the user, an LUT corresponding to the LUT type selected by the user, and export the LUT. In addition, the first image and the second image previously selected by the user may be previewed on the display interface 801, to indicate, to the user, color adjustment effect corresponding to the LUT that currently needs to be exported.

The user may select a storage location and a name of the to-be-exported LUT through an operation on the mobile phone. As shown in (b) in FIG. 8, on a display interface 802, after the user selects the first image and the second image, a prompt box 8021 may be displayed, where the prompt box 8021 is used for prompting the user to enter a file name and a storage path of the LUT. Alternatively, after the user selects the LUT type in the prompt box on the display interface 801, the user may tap an "OK" control. When the "OK" control is tapped, the mobile phone may display the display interface 802, and then further determine, by using the prompt box 8021, a file name and a storage path that the user wants to save.

A control 8022 and a control 8023 may be displayed in the prompt box 8021. The control 8022 may be used for receiving the file name entered by the user, and the control 8023 may be used for receiving the storage path entered by the user. The user may enter the file name and the file storage path of the LUT in the control 8022 and the control 8023. After completing input, the user may tap the "OK" control. When the "OK" control is tapped, the mobile phone may obtain, through the control 8022, content entered by the user, and use the content entered by the user in the control 8022 as the file name of the to-be-exported LUT. The mobile phone may obtain, through the control 8023, content entered by the user in the control 8023, and use the content entered in the control 8023 as the file path of the to-be-exported LUT. The mobile phone may store, based on the obtained file name and file path, the LUT required by the user to a specified location in the specified file name.

For example, the mobile phone may directly store the LUT to be exported by the user based on a default type (for example, the default type is a global LUT), a default file name, and a default storage path. After the storage is completed, the mobile phone may display a prompt message, where the prompt message may be used for indicating a type into which the LUT required by the user is stored, a file name, and a storage path.

For example, the user may find, based on a file path at which an LUT is stored, an LUT stored on the mobile phone, and share the LUT stored on the mobile phone to another electronic device, for example, another mobile phone or a computer. In addition, the LUT stored on the mobile phone may be read and used by any application at an application layer of the mobile phone.

Step 3: The mobile phone obtains a first file selected by the user.

The first file may include at least one of an image or a video.

For example, the user may select, on the mobile phone, an image or a video that requires color adjustment. For example, the user may start an application such as an album on the mobile phone, and select a photo as the first file, or the user my start a camera of the mobile phone to take a picture or record a video as the first file. In addition, the user may alternatively select a plurality of images or a plurality of videos as the first file. That is, the first file may include a plurality of images or a plurality of videos, or may include both an image and a video.

Figure 9:
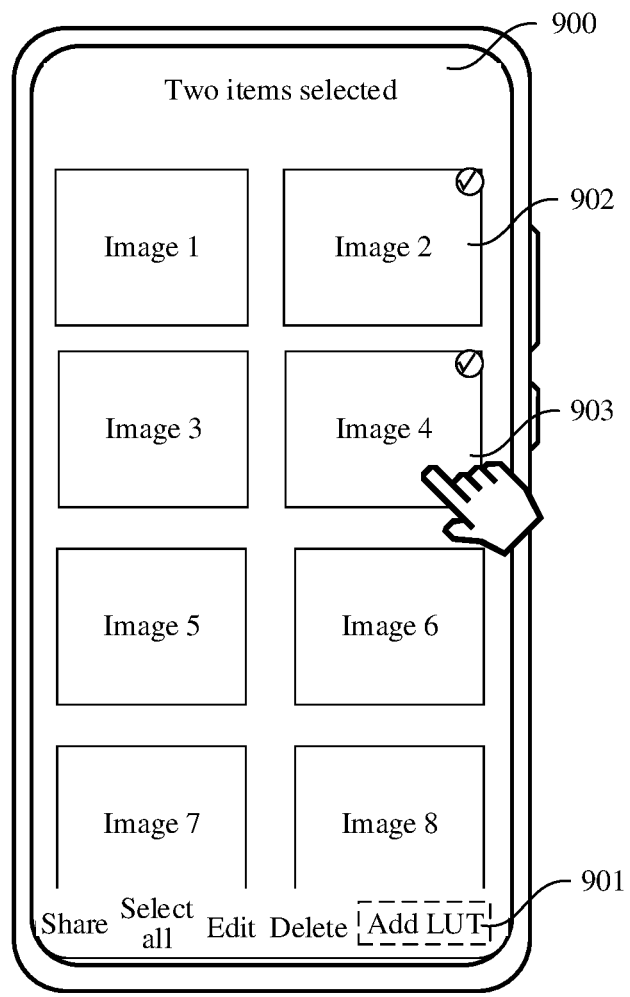
FIG. 9 is a schematic diagram of an image processing interface of a mobile phone according to an embodiment of this application.

For example, as shown in FIG. 9, on a display interface 900 (namely, a first interface) of the album APP of the mobile phone, the mobile phone may display a control 901 in a toolbar of the album APP. For example, a name of the control 901 is "Add LUT". The control 901 may be used for prompting the user to perform color adjustment on a selected image by using an LUT. The user may select a plurality of images, such as an image 902 and an image 903. When the mobile phone detects an operation performed by the user on the control 901, the mobile phone may obtain the image 902 and the image 903 selected by the user, and use both the image 902 and image 903 as the first file for subsequent color adjustment.

Figure 10:
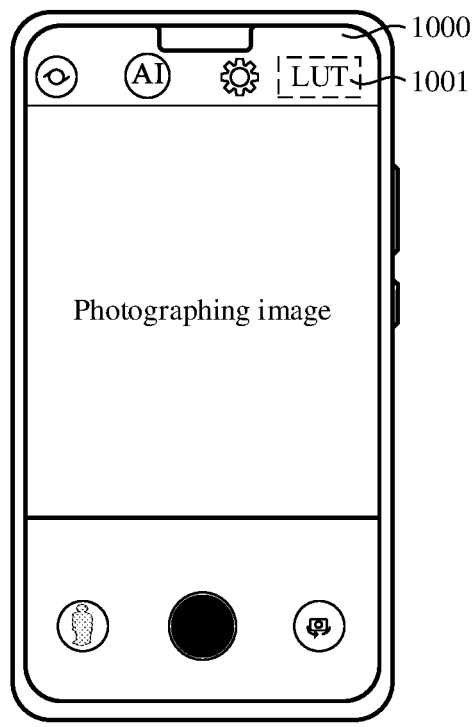
FIG. 10 is a schematic diagram of an image processing interface of another mobile phone according to an embodiment of this application.

For example, as shown in FIG. 10, the user may start a camera application on the mobile phone to capture pictures or videos in real time. A control 1001 may be displayed on a display interface 1000 (namely, a first interface) of the camera application, where the control 1001 may be used for prompting the user to perform color adjustment on a captured picture or video. When the mobile phone detects an operation performed by the user on the control 1001, the mobile phone may use a next picture or video to be captured by the user as the first file, and perform color adjustment on the next picture or video to be captured.

Figure 11:
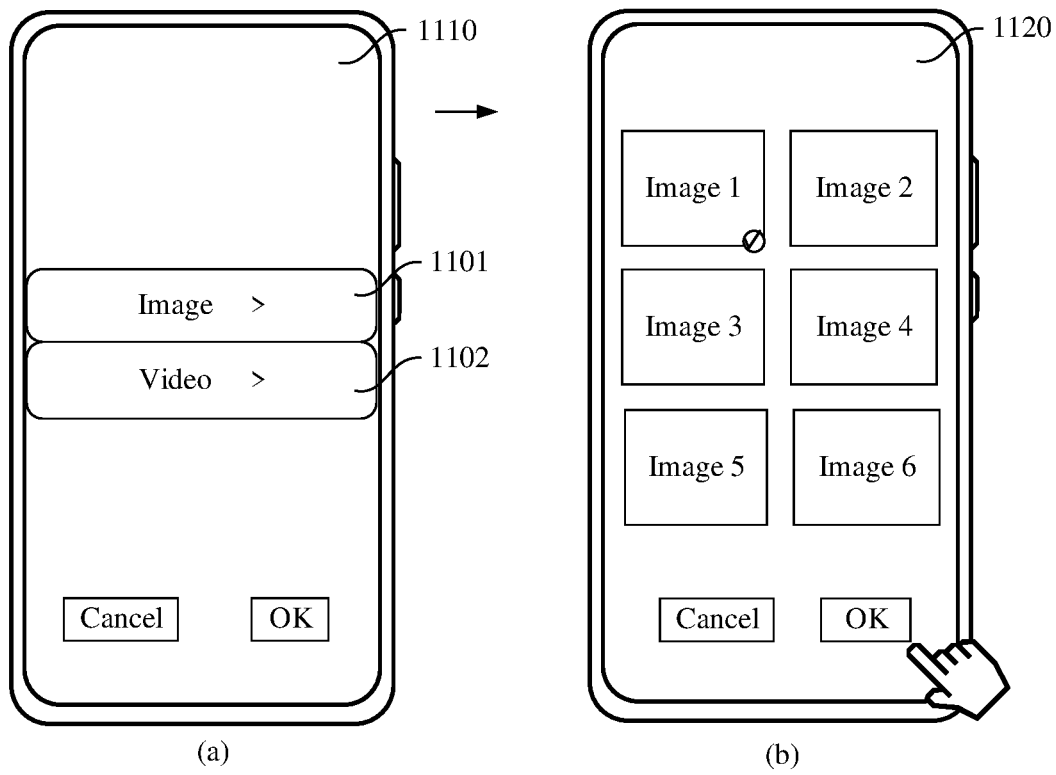
FIG. 11 is a schematic diagram of an interface for determining a first file in an image processing method according to an embodiment of this application.

For example, as shown in (a) in FIG. 11, a control 1101 and a control 1102 may be displayed on a display interface 1110. In this case, the display interface 1110 is a first interface. The control 1101 may be used for prompting the user to select a first file from images stored on the mobile phone, and the control 1102 may be used for prompting the user to select a first file from videos stored on the mobile phone. In addition, the user may first select an image by using the control 1101, and then select a video by using the control 1102, and the mobile phone may use, as the first file, both the image and the video selected by the user. The user may first tap the control 1101, and when the mobile phone detects the tap operation performed by the user on the control 1101, the mobile phone may display an interface 1120, as shown in (b) in FIG. 11. All images stored on the mobile phone may be displayed on the display interface 1120 for selection by the user. After the user completes selection and taps an "OK" control, the mobile phone may obtain an image selected by the user on the display interface 1120 as the first file. Similarly, the mobile phone may alternatively obtain, through the control 1102, a video selected by the user as the first file. After the user taps an "OK" control on the display interface 1110, the mobile phone may determine an image and a video included in a final first file.

Step 4: The mobile phone determines a target lookup table selected by the user, and performs color adjustment on the first file based on the target lookup table.

For example, a plurality of lookup tables may be generated through the steps in the foregoing embodiment. The plurality of lookup tables may include a global lookup table and a local lookup table, or may include a three-dimensional global lookup table (3D global LUT) and a three-dimensional local lookup table (3D local LUT).

The user may select any type of lookup table on the mobile phone to perform color adjustment on the first file. For example, the user may select a local lookup table for color adjustment, or may select a global lookup table for color adjustment. The lookup table selected by the user from the plurality of lookup tables is the target lookup table.

For example, the mobile phone may obtain a plurality of LUTs according to step 1 and step 2. These LUTs may be different types of lookup tables corresponding to same color adjustment effect, or different lookup tables corresponding to different color adjustment effect. The user may specify one of the plurality of LUTs for the first file selected by the user. After obtaining the LUT specified by the user, the mobile phone uses the LUT specified by the user as the target lookup table, and performs, based on the target lookup table, color adjustment on the first file selected by the user.

Figure 12:
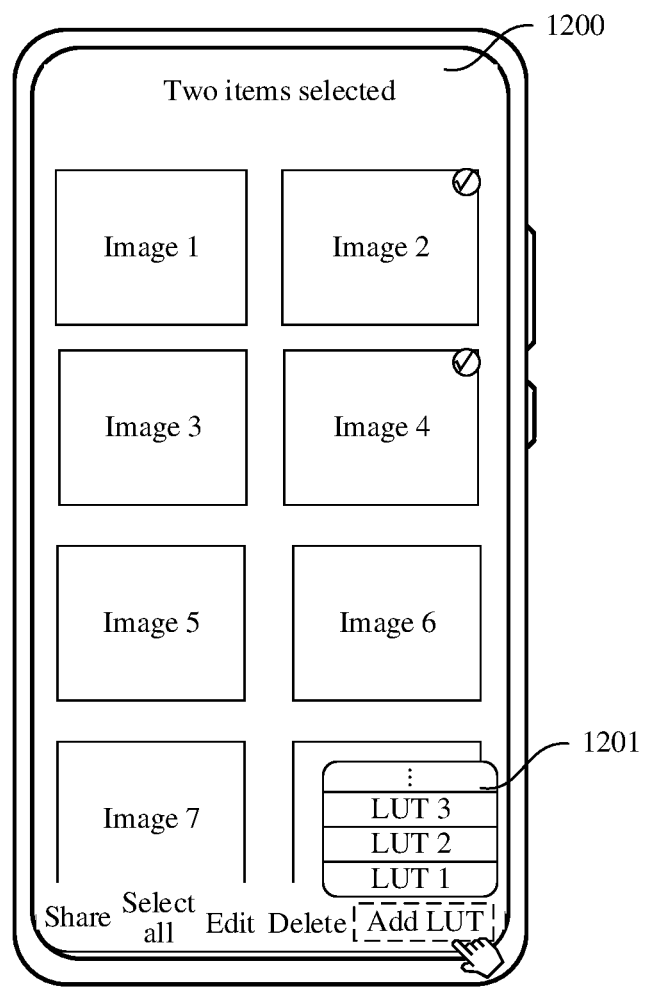
FIG. 12 is a schematic diagram of an interface for determining a target lookup table in an image processing method according to an embodiment of this application.

In an implementation, the album application is still used as an example. For example, after the user taps the control 901 "Add LUT", the mobile phone may obtain information about all LUTs stored in a memory, and then display information about each LUT (for example, a file name of the LUT). As shown in FIG. 12, the mobile phone may display a display interface 1200 (namely, a second interface). The display interface may include a control 1201, and the control 1201 may be used for displaying information about all LUTs stored on the mobile phone, for example, displaying file names of all the LUTs. The user may perform selection in the control 1201. When the mobile phone detects an operation of selecting an LUT by the user in the control 1201, the mobile phone may obtain, based on the operation performed by the user, the LUT (namely, the target lookup table) selected by the user. For example, after the mobile phone detects that the user taps an LUT with a file name of "LUT 2", the LUT with the file name of "LUT 2" is the target lookup table, and the mobile phone may perform, by using the target lookup table, color adjustment on an image (for example, the image 902 and the image 903) selected by the user, and display a color-adjusted first file.

Figure 13:
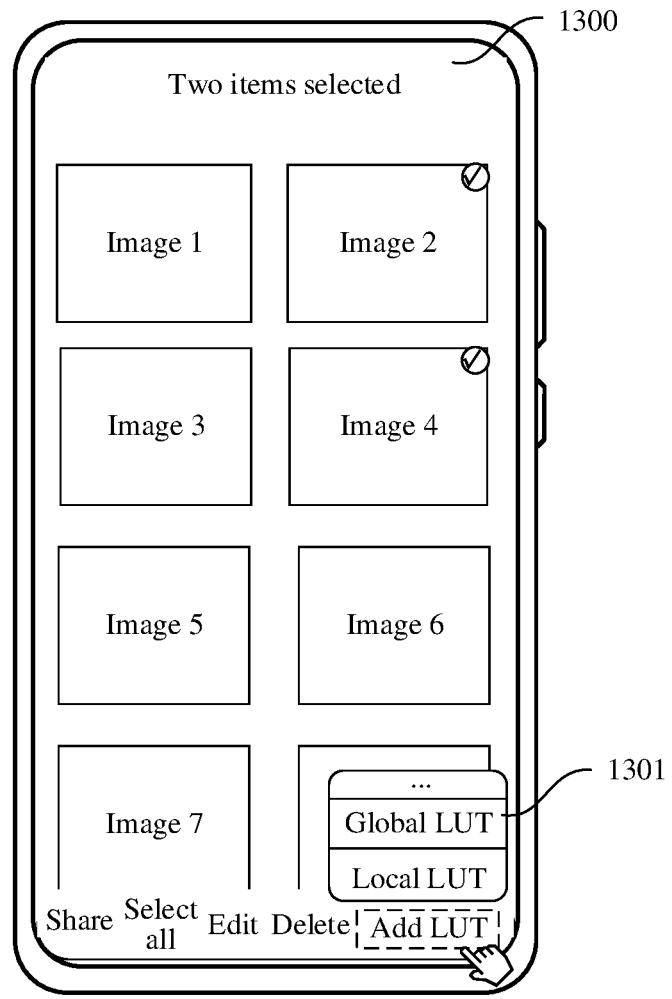
FIG. 13 is a schematic diagram of another interface for determining a target lookup table in an image processing method according to an embodiment of this application.

In another implementation, the mobile phone may first determine a lookup table type required by the user, and then filter all lookup tables on the mobile phone based on the lookup table type required by the user, so that only a lookup table matching the lookup table type required by the user is displayed for selection by the user. For example, as shown in FIG. 13, the album application is still used as an example. For example, after the user taps the control 901 "Add LUT", the mobile phone may display a display interface 1300 (namely, a third interface). The display interface 1300 may include a control 1301. The control 1301 may be used for displaying lookup table types related to all LUTs stored on the mobile phone. For example, the mobile phone currently stores a global LUT and a local LUT. The mobile phone may determine, through the control 1301, a lookup table type selected by the user. For example, if the user selects "Global LUT", the mobile phone may select a global LUT from all the stored LUTs, and then display the selected global LUT for the user to select the target lookup table. For example, the selected global LUT may be displayed in the control 1201 on the display interface 1200, and the mobile phone may determine, through the control 1201, the target lookup table selected by the user.

The mobile phone may read a color value of each pixel in the first file, for example, the image 902 and the image 903, and use the read color value as an input value. The mobile phone may determine, by querying an LUT, an output value corresponding to the input value, and after the corresponding output value is found, may replace the output value with a color value of a pixel of a picture, to change a color presented by the picture, so that color adjustment on the picture is completed. The mobile phone may display a color-adjusted image 902 and a color-adjusted image 903. The image 902 and the image 903 can present color effect expected by the user, to be specific, effect similar to that of the second image selected by the user for generating the LUT.

Values of three subpixels (R, G, B) of a 3D LUT affect each other, and a total of 255×255×255 values are available. To determine an output value corresponding to each input value, the 3D LUT needs to occupy quite large space. Space required for storing an LUT can be greatly reduced by performing LUT-based color adjustment on an image by using a lookup table interpolation method. For example, a 4×4×4 cube may be used for storing an LUT. In a structure shown in the LUT 602 in FIG. 6, values of each color value channel are divided into 4 vertices and 3 segments. In this case, the three subpixels R, G, and B of the 3D LUT have a total of 64 vertices. An output value corresponding to each vertex may be calculated based on a determined mapping relationship. For example, an output value of (0, 0, 0), an output value of (255, 255, 255), an output value of (0, 255, 0), an output value of (0, 0, 255), and an output value of (255, 0, 0) may be determined and stored in the LUT cube. In another implementation, an LUT may be stored in another manner, for example, in an 8×8×8 cube. This is not limited in this implementation.

When an LUT is stored by using the foregoing cube, a larger quantity of vertices of the cube indicates that a larger quantity of output values can be stored, the 3D LUT has more accurate color adjustment effect on an image, the 3D LUT occupies larger space, and a larger amount of computation is required for using the 3D LUT to perform color adjustment on an image. Other values are not at the vertices of the cube, and may be calculated by using an interpolation algorithm. The interpolation algorithm is a method for calculating an unknown pixel by using a known pixel. Specifically, a bilinear interpolation method, a nearest neighbor interpolation method, or the like may be selected. In the nearest neighbor interpolation method, an output value of an unknown pixel is equal to an output value of a pixel closest to the pixel. In the bilinear interpolation method, an input value of an unknown pixel is determined by calculating an average value of all adjacent pixels of the unknown pixel. In actual application, an interpolation algorithm may be selected according to a requirement. This is not limited in this implementation.

It should be understood that the steps 1, 2, 3, and 4 in this implementation do not have a strict sequential relationship, and the steps may be performed in any order according to an actual requirement. For example, steps 1 and 2 are first sequentially performed repeatedly for a plurality of times to generate a plurality of LUTs required by the user, and then, when the user needs to perform color adjustment, steps 3 and 4 are performed to select one of the generated LUTs to be used in color adjustment. For another example, step 3 is first performed to determine a first file that the user needs to process, then steps 1 and 2 are performed to generate an LUT corresponding to the first file, and finally, step 4 is performed to apply the generated LUT as a target lookup table to the first file that the user needs to process.

The image processing method provided in this embodiment may be integrated into an application such as a camera, an album, or a gallery on a mobile phone, and provided for a user as a new function of these applications. A control may be added to a display interface of these applications, to prompting, through the added control, the user to use the new function. For example, as shown in FIG. 9, the control 901 may be added to the album application, to prompt, through the control 901, the user to use the new function. Alternatively, as shown in FIG. 10, the control 1001 may be added to the camera application to prompt the user to use the new function. When detecting that the foregoing control is triggered, the mobile phone may perform the image processing method provided in this embodiment to perform color adjustment on an image.

Alternatively, the image processing method provided in this embodiment may be packaged into a separate application (APP) such as an "application A". When a user starts the "application A" on the mobile phone, the mobile phone may be triggered to perform the image processing method provided in this embodiment, so that the mobile phone generates an LUT required by the user, and use the generated LUT to perform color adjustment on an image as required by the user.

In the foregoing embodiment, the mobile phone may automatically generate a corresponding LUT based on the first image and the second image selected by the user, and the user does not need to manually produce an LUT. In this way, the image processing method in this embodiment can make a process of generating an LUT more convenient, and improve efficiency of generating an LUT. In addition, for the user, the user can perform professional color adjustment on an image without understanding a principle of the image. This can improve user experience and meet an image processing requirement of the user.

It should be understood that an example in which the image processing method is performed on a mobile phone is used in the foregoing embodiment, and the image processing method provided in this embodiment may alternatively be applied to another electronic device such as a tablet computer, a personal computer, or a wearable electronic device. This is not limited in this application.

An embodiment of this application further provides an electronic device. The electronic device may include: a display (for example, a touchscreen), a camera, a memory, and one or more processors. The display, the camera, and the memory are coupled to the processor. The memory is configured to store computer program code, and the computer program code includes computer instructions. When the processor executes the computer instructions, the electronic device may perform the functions or the steps performed by the mobile phone in the foregoing method embodiment. For a structure of the electronic device, refer to the structure of the electronic device 100 shown in FIG. 1.

An embodiment of this application further provides a computer storage medium. The computer storage medium includes computer instructions. When the computer instructions run on an electronic device, the electronic device is enabled to perform the functions or the steps performed by the mobile phone in the foregoing method embodiment.

An embodiment of this application further provides a computer program product. When the computer program product runs on a computer, the computer is enabled to perform the functions or the steps performed by the mobile phone in the foregoing method embodiment.

Based on the descriptions of the foregoing implementations, a person skilled in the art may clearly understand that, for a purpose of convenient and brief description, division into the foregoing functional modules is merely used as an example for illustration. In actual application, the foregoing functions may be allocated to different functional modules and implemented according to a requirement. In other words, an inner structure of the apparatus is divided into different functional modules to implement all or some of the functions described above.

In the several embodiments provided in this application, it should be understood that the disclosed apparatus and method may be implemented in other manners. For example, the described apparatus embodiment is merely exemplary. For example, the module or unit division is merely logical function division and may be other division during actual implementation. For example, a plurality of units or components may be combined or integrated into another apparatus, or some features may be ignored or not performed. In addition, the shown or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separated. A part shown as a unit may be one or more physical units, and may be located at one position, or may be distributed at different positions. Some or all of the units may be selected according to actual requirements to achieve the objectives of the solutions of the embodiments.

In addition, functional units in the embodiments of this application may be integrated into one processing unit, or each of the units may be physically separated, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in the embodiments of this application essentially, or the part contributing to the related art, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods in the embodiments of this application. The storage medium includes: any medium that can store program code, for example, a USB flash drive, a removable hard disk, a read-only memory (ROM), a random access memory (RAM), a magnetic disk, or an optical disc.

The foregoing content is merely specific implementations of this application, but is not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An image processing method, wherein the method comprises:
   displaying a first interface, and determining, on the first interface, a first file selected by a user;
   displaying a second interface, and displaying a generated lookup table on the second interface; wherein, the lookup table is generated by a preset deep neural network model or a polynomial fitting algorithm;
   determining, on the second interface, a target lookup table selected by the user from the lookup table, and performing color adjustment on the first file by using the target lookup table; and
   displaying a color-adjusted first file,
   wherein the method further comprises:
   determining a first image selected by the user and a second image corresponding to the first image, wherein the second image is an image obtained through first color adjustment on the first image; and
   generating, based on the first image, the second image, and the deep neural network model, a lookup table corresponding to the first color adjustment; and generating, based on the first image, the second image, and the polynomial fitting algorithm, a lookup table corresponding to the first color adjustment, wherein the lookup table corresponding to the first color adjustment is used for enabling the first file and the second image to have same color adjustment effect during the color adjustment on the first file.

2. The method according to claim 1, wherein the lookup table comprises a global lookup table and a local lookup table.

3. The method according to claim 1, wherein the generating, based on the first image, the second image, and the deep neural network model, the lookup table corresponding to the first color adjustment comprises:
inputting the first image and the second image to a preset deep neural network model, to obtain a global lookup table output by the deep neural network model.

4. The method according to claim 1, wherein the generating, based on the first image, the second image, and the deep neural network model, the lookup table corresponding to the first color adjustment comprises:
segmenting the first image and the second image into N subblocks in a same segmentation manner;
combining a first subblock in the first image and a second subblock in the second image into an input data pair to obtain N input data pairs, wherein a location of the first subblock of the input data pair in the first image is the same as a location of the second subblock in the second image;
inputting the N input data pairs to the deep neural network model to obtain N subblock lookup tables; and
combining the N subblock lookup tables to obtain a local lookup table, wherein N is a positive integer.

5. The method according to claim 4, wherein the combining the N subblock lookup tables to obtain a local lookup table comprises:
smoothing each subblock lookup table; and
combining smoothed N subblock lookup tables to obtain the local lookup table.

6. The method according to claim 5, wherein the smoothing each subblock lookup table comprises:
determining a weight corresponding to each subblock lookup table;
obtaining a first product of an output value of an $N^{th}$ subblock lookup table and a weight corresponding to the $N^{th}$ subblock lookup table, and a second product of an output value of an adjacent lookup table and a weight corresponding to a adjacent lookup table, wherein the adjacent lookup table is a subblock lookup table adjacent to the $N^{th}$ subblock lookup table; and
replacing the output value of the $N^{th}$ subblock lookup table with a sum of the first product and the second product.

7. The method according to claim 1, wherein before the generating, based on the first image, the second image, and the deep neural network model, the lookup table corresponding to the first color adjustment, the method further comprises:
obtaining a first sample and a plurality of second samples obtained through different color adjustment on the first sample;
combining the first sample and the second sample of the first sample into a sample pair, wherein each sample pair comprises a first sample and a second sample of the first sample; and
inputting the sample pair to the deep neural network model to train the deep neural network model, so that a trained deep neural network model can output a global lookup table corresponding to each sample pair.

8. The method according to claim 1, wherein the generating, based on the first image, the second image, and the polynomial fitting algorithm, the lookup table corresponding to the first color adjustment comprises:
using a color value of the first image as an input value, and using a color value of the second image as an output value;
determining a target polynomial between the input value and the output value by using a polynomial fitting algorithm; and
outputting, by using the target polynomial, the lookup table corresponding to first color adjustment effect.

9. The method according to claim 1, wherein before the displaying a second interface, and displaying a generated lookup table on the second interface, the method further comprises:
displaying a third interface, and determining, on the third interface, a lookup table type selected by the user, wherein the lookup table type comprises a global lookup table and a local lookup table; and
obtaining a lookup table corresponding to the lookup table type, to display the lookup table corresponding to the lookup table type on the second interface.

10. The method according to claim 1, wherein the first file comprises at least one of an image or a video.

11. An electronic device, comprising:
a display;
one or more processors; and
a memory, wherein
the display is configured to display an image generated by the processor, the memory stores one or more computer programs, including instructions that, when executed by the electronic device, enable the electronic device to perform image processing operations comprising:
displaying a first interface, and determining on the first interface, a first file selected by a user;
displaying a second interface, and displaying a generated lookup table on the second interface; wherein, the lookup table is generated by a preset deep neural network model or a polynomial fitting algorithm;
determining, on the second interface, a target lookup table selected by the user from the lookup table, and performing color adjustment on the first file by using the target lookup table; and
displaying a color-adjusted first file;
wherein the image processing operations further comprise:
determining a first image selected by the user and a second image corresponding to the first image, wherein the second image is an image obtained through first color adjustment on the first image; and
generating, based on the first image, the second image, and the deep neural network model, a lookup table corresponding to the first color adjustment; and generating, based on the first image. the second image, and the polynomial fitting algorithm, a lookup table corresponding to the first color adjustment, wherein the lookup table corresponding to the first color adjustment is used for enabling the first file and the second image to have same color adjustment effect during the color adjustment on the first file.

12. A non-transitory computer-readable storage medium, storing instructions that, when run on an electronic device, enable the electronic device to perform image processing operations comprising:

displaying a first interface, and determining, on the first interface, a first file selected by a user, displaying a second interface, and displaying a generated lookup table on the second interface, wherein, the lookup table is generated by a preset deep neural network model or a polynomial fitting algorithm;

determining, on the second interface, a target lookup table selected by the user from the lookup table, and performing color adjustment on the first file by using the target lookup table;

and displaying a color-adjusted first file;

wherein the image processing operations further comprise:

determining a first image selected by the user and a second image corresponding to the first image, wherein the second image is an image obtained through first color adjustment on the first image; and generating, based on the first image, the second image, and the deep neural network model, a lookup table corresponding to the first color adjustment; and generating, based on the first image, the second image, and the polynomial fitting algorithm, a lookup table corresponding to the first color adjustment, wherein the lookup table corresponding to the first color adjustment is used for enabling the first file and the second image to have same color adjustment effect during the color adjustment on the first file.

* * * * *

UNITED STATES PATENT AND TRADEMARK OFFICE
CERTIFICATE OF CORRECTION

| | | |
|---|---|---|
| PATENT NO. | : 12,462,448 B2 | Page 1 of 1 |
| APPLICATION NO. | : 18/279093 | |
| DATED | : November 4, 2025 | |
| INVENTOR(S) | : Bin Xiao et al. | |

It is certified that error appears in the above-identified patent and that said Letters Patent is hereby corrected as shown below:

On the Title Page

Change "(71) Applicant: HONOR DEVICE CO., LTD., Guangdong (CN)" to --(71) Applicant: HONOR DEVICE CO., LTD., Shenzhen (CN)--.

Signed and Sealed this
Second Day of December, 2025

John A. Squires
*Director of the United States Patent and Trademark Office*